US008996688B2

(12) United States Patent
Arrasvuori

(10) Patent No.: US 8,996,688 B2
(45) Date of Patent: Mar. 31, 2015

(54) METHOD AND APPARATUS FOR MONITORING AND CONTROLLING DATA SHARING

(75) Inventor: Juha Henrik Arrasvuori, Tampere (FI)

(73) Assignee: Nokia Corporation, Espoo (FI)

( * ) Notice: Subject to any disclaimer, the term of this patent is extended or adjusted under 35 U.S.C. 154(b) by 817 days.

(21) Appl. No.: 13/149,486

(22) Filed: May 31, 2011

(65) Prior Publication Data

US 2012/0311131 A1 Dec. 6, 2012

(51) Int. Cl.
*G06F 15/173* (2006.01)
*G06F 21/62* (2013.01)
*H04L 29/06* (2006.01)
*H04W 12/08* (2009.01)
*H04W 4/00* (2009.01)
*H04W 12/02* (2009.01)

(52) U.S. Cl.
CPC .......... *G06F 21/6245* (2013.01); *H04L 63/102* (2013.01); *H04W 12/08* (2013.01); *H04W 4/003* (2013.01); *H04W 12/02* (2013.01)
USPC .......................... 709/224; 709/223; 709/225

(58) Field of Classification Search
CPC ....................................................... H04W 8/16
USPC ................................................. 709/223–225
See application file for complete search history.

(56) References Cited

U.S. PATENT DOCUMENTS

| 6,360,102 | B1 | 3/2002 | Havinis et al. |
| 7,778,175 | B2 * | 8/2010 | Fleury et al. ............... 370/230.1 |
| 8,265,595 | B1 | 9/2012 | Reeves et al. |
| 2004/0176104 | A1 | 9/2004 | Arcens |
| 2006/0262345 | A1 * | 11/2006 | Le Leannec et al. ........ 358/1.15 |
| 2007/0248221 | A1 | 10/2007 | Chatterjee et al. |
| 2008/0084896 | A1 * | 4/2008 | Fleury et al. .................. 370/468 |
| 2010/0165858 | A1 * | 7/2010 | Morita .......................... 370/252 |
| 2011/0030067 | A1 | 2/2011 | Wilson |
| 2012/0202447 | A1 | 8/2012 | Edge et al. |

FOREIGN PATENT DOCUMENTS

| EP | 1965572 A2 | 9/2008 |
| EP | 2222052 A1 | 8/2010 |
| WO | 2004042614 A1 | 5/2004 |

OTHER PUBLICATIONS

International Search Report and Written Opinion received for corresponding Patent Cooperation Treaty Application No. PCT/FI2012/050526, dated Oct. 3, 2012, 16 pages.
Sam, "Why I Share and Why You Will Too", Leveraging Ideas, Jan. 25, 2010. http://www.leveragingideas.com/2010/01/25/why-i-share-and-why-you-will-too/.
Extended European Search Report for corresponding European Application No. 12792962.8, dated Dec. 1, 2014, 4 pages.

* cited by examiner

*Primary Examiner* — Mohamed Wasel
(74) *Attorney, Agent, or Firm* — Ditthavong & Steiner, PC

(57) ABSTRACT

An approach is provided for managing data sharing at user device. A data sharing module determines one or more requests for a transmission or a reception of one or more data items at a device. Next, the data sharing module causes, at least in part, a time delay in the transmission or the reception of the one or more data items. Further, the data sharing module determines to monitor during the time delay for one or more inputs specifying at least one operation with respect to the transmission or the reception of the one or more data items.

19 Claims, 13 Drawing Sheets

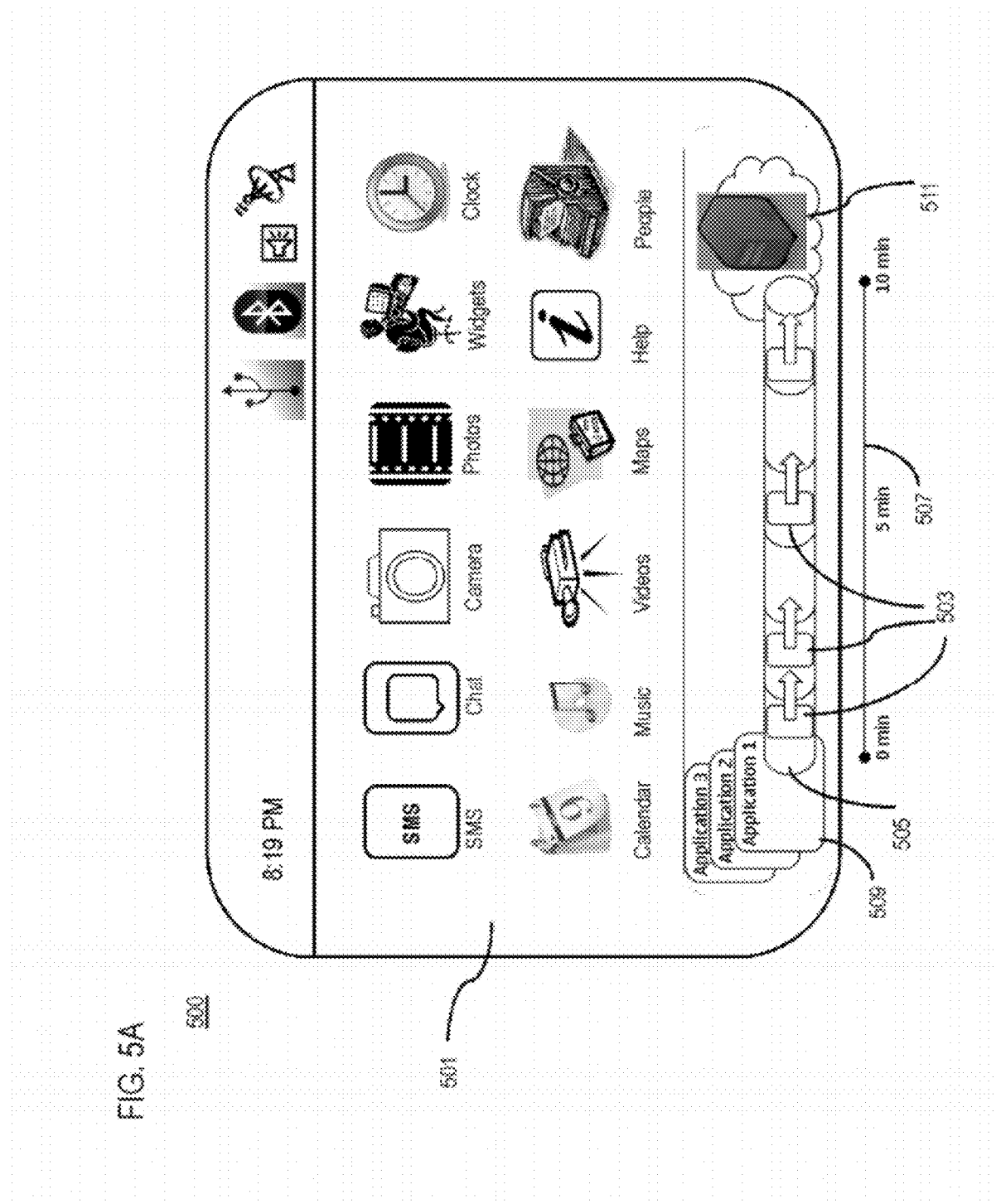

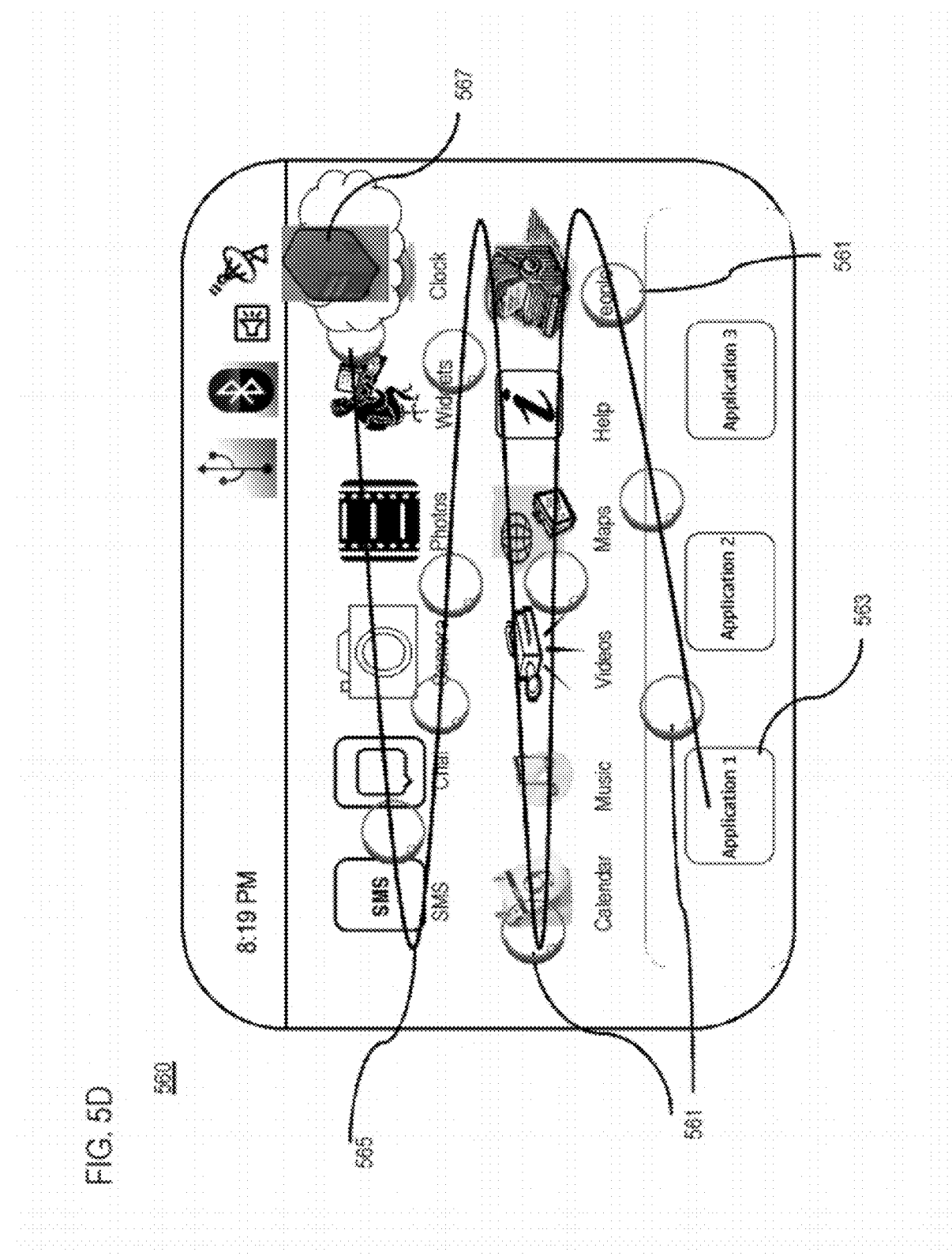

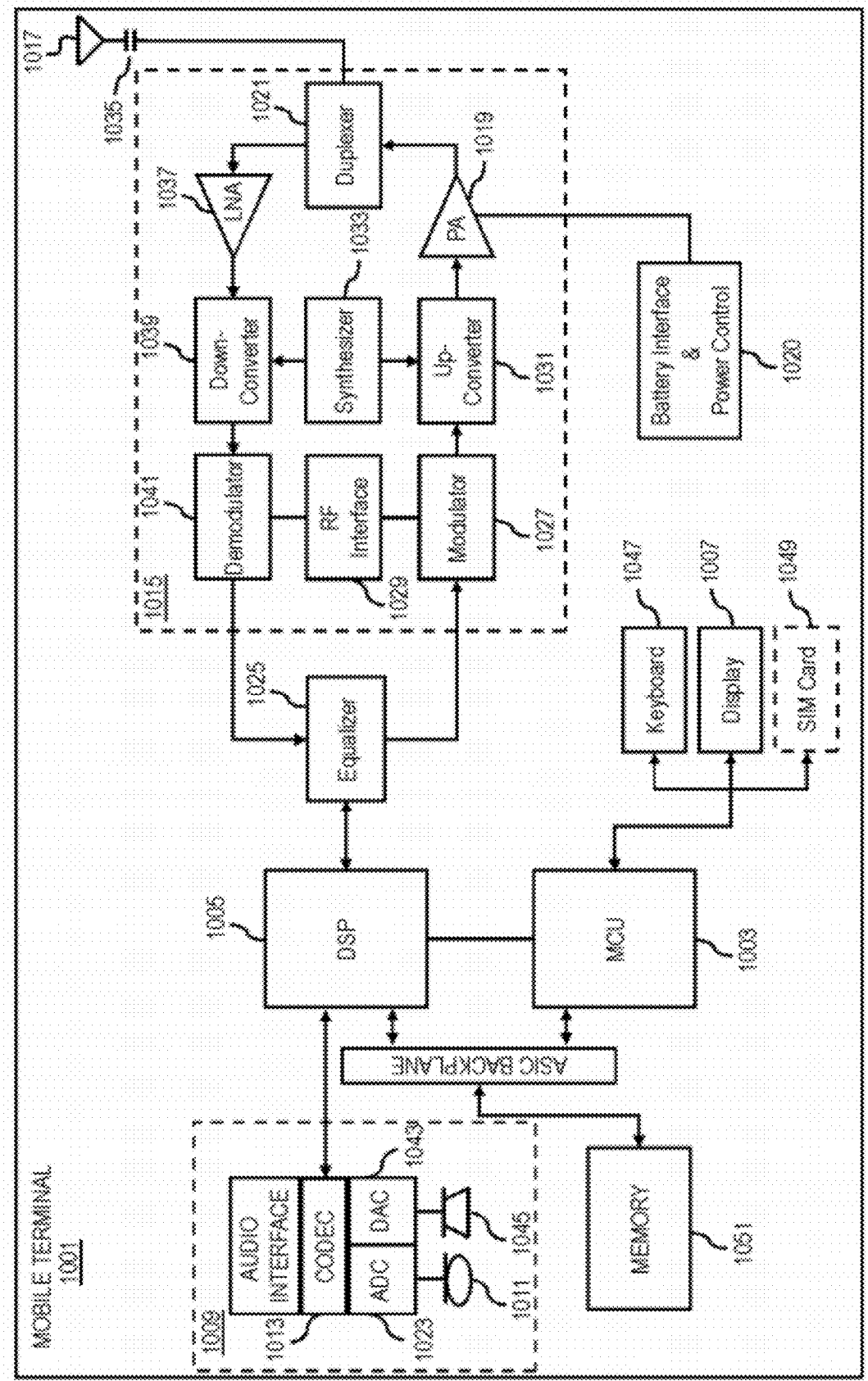

METHOD AND APPARATUS FOR MONITORING AND CONTROLLING DATA SHARING

BACKGROUND

Service providers and device manufacturers (e.g., wireless, cellular, etc.) are continually challenged to deliver value and convenience to consumers by, for example, providing compelling network services. One area of interest has been in user data privacy as users engage with other users, conduct various transactions or utilize different services via one or more communication networks. For example, many devices are equipped with various applications and sensors including cameras, microphones, positioning systems, gyroscopes and the like that enable them to detect the device location and position, acquire images and sound and other contextual data, which can be requested for sharing by other users and/or service providers. Unfortunately, sharing user data with other users and/or service providers may reveal personal information about the user that could compromise user privacy, user data and/or jeopardize user anonymity. Further, other users and/or service providers may send data to a user device which the user may wish not to accept.

SOME EXAMPLE EMBODIMENTS

Therefore, there is a need for an approach for users to manage data sharing on a user device.

According to one embodiment, a method comprises determining one or more requests for a transmission or a reception of one or more data items at a device. The method also comprises causing, at least in part, a time delay in the transmission or the reception of the one or more data items. The method further comprises determining to monitor during the time delay for one or more inputs specifying at least one operation with respect to the transmission or the reception of the one or more data items.

According to another embodiment, an apparatus comprising at least one processor; and at least one memory including computer program code for one or more programs, the at least one memory and the computer program code configured to, with the at least one processor, cause the apparatus to determine one or more requests for a transmission or a reception of one or more data items at a device. The apparatus is also caused to cause, at least in part, a time delay in the transmission or the reception of the one or more data items. The apparatus is further caused to determine to monitor during the time delay for one or more inputs specifying at least one operation with respect to the transmission or the reception of the one or more data items.

According to another embodiment, a computer-readable storage medium carrying one or more sequences of one or more instructions which, when executed by one or more processors, cause an apparatus to cause, at least in part, a time delay in the transmission or the reception of the one or more data items. The apparatus is further caused to determine to monitor during the time delay for one or more inputs specifying at least one operation with respect to the transmission or the reception of the one or more data items.

According to another embodiment, an apparatus comprises means for determining one or more requests for a transmission or a reception of one or more data items at a device. The apparatus also comprises means for causing, at least in part, a time delay in the transmission or the reception of the one or more data items. The apparatus further comprises means for determining to monitor during the time delay for one or more inputs specifying at least one operation with respect to the transmission or the reception of the one or more data items.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claim.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 5A-5D, and 6-7 are diagrams of user interfaces utilized in the processes of FIGS. 3 and 4, according to various embodiments;

FIG. 10 is a diagram of a mobile terminal (e.g., handset) that can be used to implement an embodiment of the invention.

DESCRIPTION OF SOME EMBODIMENTS

Examples of a method, apparatus, and computer program are disclosed for users to manage data sharing on a user device. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term application programming interface (API) refers to a particular set of rules and specifications that a calling software application can follow to access and make use of the services and resources provided by the application, device, operating system, etc. Although various embodiments are described with respect to application programming interfaces (APIs), it is contemplated that the approach described herein may be used with other protocols, instruction sets, rule bases, definitions, functions, libraries, object classes, data structures, procedure calls, web services and the like.

Figure 1:
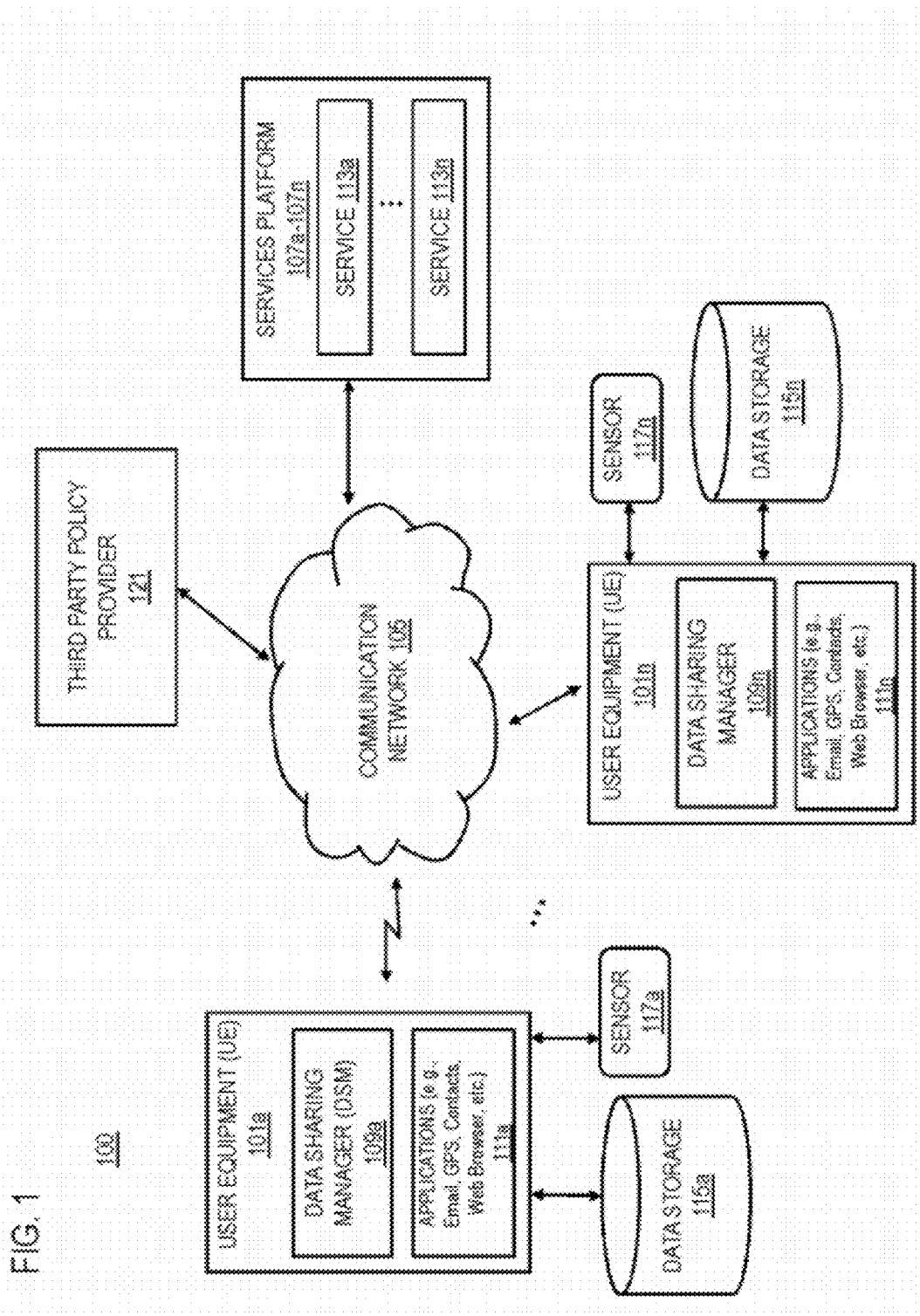
FIG. 1 is a diagram of a system for a user to manage data sharing, according to one embodiment.

FIG. 1 is a diagram of a system for a user to manage data sharing, according to one embodiment. The system is configured to enable a user to manage data sharing with one or more other users and/or one or more service platforms wherein the user can monitor the data to be transmitted (e.g., outgoing) from and/or received (e.g., incoming) at a user device. By way of example, data can include any personal, private, confidential, privileged and the like information related to the user, a user device, one or more service platforms, one or more applications and the like. For example, the data can include user privacy information, profile, location, home address, shopping habits, web browsing history, social networking, phone number, one or more accounts (e.g., banks, networks, library, work, etc.), database (e.g., phone numbers, emails, addresses, files, notes, etc.); user device information such as device type, one or more applications on the device, contents in the device memory, device capability; and/or one or more service platform information such as service provide name, service type, account number, availability or a combination thereof. User data can be collected, saved, analyzed and/or possibly shared amongst different entities (e.g., service platforms, advertising companies, goods and service providers, other users, etc.) by employing powerful data gathering and sharing technologies (e.g., embedded in user applications, services, devices, etc.) which in many instances, the users are either unaware of and/or do not know how to control.

Further, aside from the annoying aspects of tracking and/or spam which may result, another concern is that criminals can access (e.g., unauthorized request, reception and/or data mining of) identifying information which can cause serious harm to the user and/or user device data, security, privacy integrity. Furthermore, as users often utilize different applications and/or services (e.g., media player, internet browser, GPS, navigation, social networking and the like), these applications and/or services collect, transmit and/or share many different types of data related to the user and/or user device. For examples, one or more applications and/or services may determine data on one or more user activity; for example, what kind of music the user is interested in (e.g., buys, listens to, etc.), what websites the user visits, what keywords the user searches on, who are user's friends in social and/or online services, and the like. As mentioned earlier, such applications and/or services collect and/or share user data when the user utilizes one or more of the applications and/or services. However, information on the data collection and/or the sharing are not clearly declared, shown and/or explained to the user (e.g., risks, benefits, necessity, timing, source, destination/termination point, etc.) and the user does not have a user friendly option for managing the collection and/or sharing of the user data. In other cases, such data collection and/or sharing can be performed as background processes that are not shown or indicated to the user. As result, a user may not be aware of when and to what extent applications are transmitting and/or receiving information or data.

As a result, for example, such issues can affect the user and/or the user experience by negatively impacting user trust in the applications and/or the services (e.g., less trust when the user does not know exactly what user data are collected and/or are to be shared with one or more unknown entities and for what purposes). Moreover, the user experience and/or trust can be negatively impacted if the user cannot ascertain one or more risks and/or benefits of allowing the collection and/or the sharing of the user data. Conversely, collectors of the user data claim that the data can provide for improved e-commerce, user experience, customer service, products, services, and can result in further customized services and/or products for a specific user or group of users. For example, a user requesting from a service provider for a listing for a coffee-shop near the user's current location can benefit if the service provider was able to substantially automatically (e.g., without user input) access, ascertain and/or receive location information of the user (e.g., determine the location of the user), then the service provider could provide one or more coffee-shop location listings near the user's location without the user needing to determine/input any user location information.

In some applications and/or user devices, there are user/data privacy policies/filters, which apply one or more user and/or predefined settings to the user and/or user device data sharing. However, such implementations generally provide little or no visibility to the user as to what type of data are being collected, who/what is the requesting source (e.g., an application, a service provider, a data mining application, etc.) and whom will the data be send to and/or shared with. Some of the applications provide some notification to the user, but it can be encoded in some computer language unfamiliar to the user and/or can be of such complexity that the user cannot readily ascertain its meaning and possible impacts on the user and/or user device data.

In addition, privacy policies/settings may be specific to an application, a group of applications, a service, a group of services, a device, a system, or a combination thereof. As one example, one privacy policy may be specific to one software application, while another privacy policy may be specific to another software application. As another example, a privacy policy may be specific to a group of services that are considered as advertising services. Also, as another example, there may be a privacy policy specific to a device with a GPS sensor and another privacy policy specific to a device without the GPS sensor such that the privacy policy may be different depending on the capability of the device. User settings related to privacy are potentially problematic in terms of user experience. This is because the user may not be aware of differences between applications (for example, several applications doing the same thing), plug-in architectures between applications (the privacy preferences of a plug-in would actually be preferences for the host applications) and different types of prompts and indications by different, potentially third party applications. With growth of online user activity and a growing combination of privacy and/or security policies that a user may have to know about, understand, setup and monitor, it can be a daunting task for a user to continuously manage user and/or user data privacy and sharing processes ongoing on a user device.

To address this problem, a system 100 of FIG. 1 introduces the capability for a user to manage data sharing on a user device. More specifically, the system 100 detects when a user device is receiving and/or transmitting information and then introduces a time delay during which the user can take some action with respect to the information. For example, the information transmission or reception can be delayed to enable the user to identify the application, data, information, etc. that is being exchanged and then determine whether to allow the exchange to take place. In one embodiment, to assist the user in taking such action, the system 100 can render a user interface or user interface element (e.g., a timeline) that can illustrate the components (e.g., the originating application or node, the terminating application or node, the data items, etc.) involved in the exchange as well as some indicator to illustrate the progress of the time delay (e.g., an animated timeline, a timer, etc.). In this way, the system 100 can present the user with sufficient information to control or manage the information or data that is to be transmitted or received at the user device, thereby enhancing information privacy and/or security.

According to one embodiment, the system 100 determines to present to and enable a user to manage one or more requests for sharing data associated with a user and/or a user device UE 101 (e.g., transmit from and/or receive at a user device) from one or more applications 111 and/or one or more services 113, For example, an application 111 or a services 113 may request to retrieve data maintained in data storage 115 as associated with a user and/or the user device UE 101, such that this data may be shared with one or more other applications, one or more other users, one or more other user devices (e.g., UE 101n) and/or one or more services 113. The data may include various types of data including a user profile information, digital media in a user device, user calendar information, context information of the user, user location, web browsing history, social networking activities and contacts and etc. Also, one or more applications 111 and/or one or more services 113 may request to acquire and share the data associated with a user and/or a user device by way of one or more sensors 117 of the device. Further, the one or more applications 111 may request from and/or send data to the one or more services 113, one or more other users and/or one or more other sources available via communication network 105. Furthermore, the services platform 107, other network entities and/or other users may request and/or send data to the user device (e.g., targeted to the one or more applications 111 and/or the user device UE 101).

As shown in FIG. 1, the system 100 comprises user equipment (UEs) 101a-101n (also collectively referred to as UEs or UE 101) having connectivity to one or more service platforms 107a-107n (also collectively referred to as services platform 107) via a communication network 105. The services platform 107 include one or more services 113a-113-n, which can provide one or more services. Further, the UE 101 and the services platform 107 may also have connectivity to a third party policy provider 121. The services platform 107 may provide various services to the user device, including information processing services, data retrieval services and the like. By way of example, the services may be in the form of one or or more executable web services or network applications, which may be executed independently of or in connection with one or more applications 111 of the UE 101. The UE 101 may also include a data sharing manager 109 (e.g., respective data sharing managers 109a-109n of the UEs 101a-101n) (DSM 109) that can communicate with the UE applications 111, the services platform 107, other user devices, the third party policy provider 121 and/or other communication network 105 components. It is noted that in certain instances, the service platform 107 and third party provider 121 may be integrated. Also, the DSM 109 may be implemented as an independent module, within the UE 101, within the service platform 107, within the third party policy provider 121 and/or within any other component connected via the communication network 105.

The DSM 109 may be utilized to enable a user to manage one or more data sharing requests from one or more applications, one or more services platforms 107 and/or one or more other users. The one or more applications may be one of the UE applications 111, which may include various types of software application in the UE 101. By way of example, if the user device is the UE 101a, the application that requests for the data may be the UE application 111a or an application of another device such as the UE application 111n of the UE 101n. The service that requests for the data may include at least one of the services 113a-113n in the services platform 107, which are accessible via the communication network 105. Further, the UE 101 may be connected to a sensor 117, which is used to collect various types of sensor data. The sensor may include a location sensor such as a global positioning system (GPS) device, a sound sensor, a speed sensor, a brightness sensor, etc. The UE 101 may also be connected to a data storage medium 115 (e.g., data storage media 115a-115n) to store various types of data and applications, for example, sensor data, user data, privacy data, application data, executable applications, device data, network data, links to data stored remotely, and the like.

For example, the DSM 109 receives one or more requests (e.g., from one or more applications and/or one or more services platforms 107) when data is to be transmitted from and/or received at the UE 101. Further, the DSM 109 determines one or more metadata related, at least in part, to the data, source of the one or more requests, destination (e.g., termination point) of the data, reasons for the one or more requests, one or more risks and/or benefits for sharing the data and the like. Furthermore, the metadata is presented via a user interface on the UE 101 (e.g., one or more visual presentation renderings) to the user of the UE 101. Moreover, the DSM 109 is capable of providing for the user to perform, at least in part, one or more actions on the data to be transmitted from and/or received at the UE 101.

In one embodiment, the DSM 109 determines one or more requests to transmit data (e.g., user data, application data, device data, etc.) from a user device (e.g., UE 101a) to one or more other user devices (e.g., UE 101n) and/or to one or more service platforms 107. The one or more requests may be generated, at least in part, by the applications 111, one or more other user devices UE 101n and/or one or more service platforms 107. For example, one or more applications 111 (e.g., a navigation application) attempt to send one or more data items (e.g., user locations) to one or more services platforms 107 (e.g., a navigation service provider). Further, the DSM 109 determines one or more requests for transmission of the one or more data items. In another embodiment, one or more services platforms 107 (e.g., a search services provider) requests one or more data items (e.g., user profile) and one or more applications (e.g., user profile register) attempt to cause one or more transmissions of the data items wherein the DSM 109 determines the one or more transmission requests. In scenarios similar to the above scenarios, the DSM 109 may determine and present one or more metadata, one or more risks, one or more benefits, one or more indicators, one or more user actions and the like related to the one or more data items for sharing whereby In another embodiment, the DSM 109 of UE 101 determines one or more requests to for the UE 101 to receive one or more data items (e.g., user data, application data, device data, service data, etc.) from one or more other user devices UE 101n and/or one or more services platforms 107, which may be in response to one or more requests for the UE 101 for one or more data items. For example, one or more services platform 107 (e.g., a navigation service provider) may attempt to send one or more data items (e.g., map information) to UE 101 wherein the DSM 109 determines one or more requests for reception of the one or more data items. In another embodiment, one or more other users and/or user devices (e.g., a family member) may wish to send one or more data items (e.g., a music file, a picture, etc.) to the UE 101 wherein the DSM 109 determines the one or more reception requests. In scenarios similar to the above scenarios, the DSM 109 may determine and present one or more metadata, one or more risks, one or more benefits, one or more indicators, one or more user actions and the like related to the one or more data items for sharing.

Further, by employing the DSM 109 the user and/or UE 101 may further ascertain value, necessity, source, reason, risk, benefit, terminating point (destination), intended use, and the like information related to sharing one or more data items via a user device UE 101. In one embodiment, the DSM 109 presents this information to the user via graphical renderings in a user interface of the UE 101. For example, the DSM 109 can visualize the information transfer process as a "pipeline" whereby information is animated to "flow" from originating applications or nodes to terminating applications or nodes. The rate of "flow" can be timed to correspond with a pre-configured time delay during which the user can act on the pending information transfer. It is contemplated that any visualization, animation, theme, graphics, etc. can be used to represent the information transfer and/or its components. In one embodiment, if the user takes no action during the time delay, the system 100 can enable the information transfer to proceed. In other embodiments, the system 100 can cancel the transfer if no user action is taken. In another embodiment, the user can click or select renderings of data items of the information exchange to view additional information (e.g., identification of the item, risks, benefits, etc.), or take action (e.g., cancel, allow, introduce a further delay, etc.) with respect to the item.

In one embodiment, the system 100 determines an intended use of the data item to be shared by one or more applications and/or services platform based on determined metadata and/or privacy policy settings, data items associated therewith, local data or a combination thereof. For example, if the request for data items is to provide information in relation to an advertisement service (e.g., a cookie or tracking code), the DSM 109 may, at least in part, determine one or more risks associated with such data items and, for example, even restrict and/or suggest to restrict access to the local data. This may be because the advertising service may be considered a stranger or an unknown service that the user does not feel comfortable sharing much of their information about; thus policy settings for this service could enforce restricted access, an error code, a message/notification/indicator prompting the user for action.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, the privacy management platform 103, the service platform 107 and third party policy provider communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
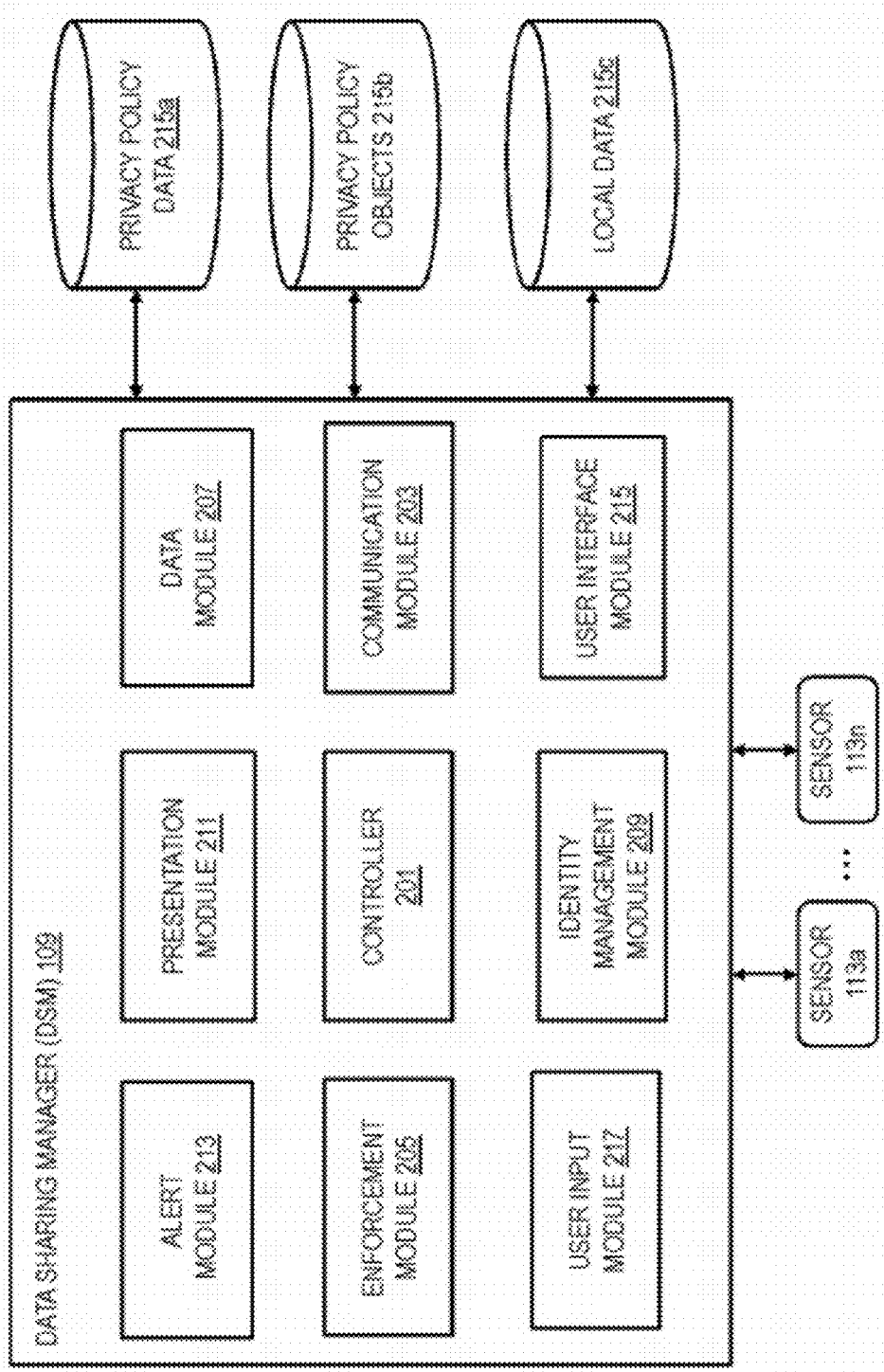
FIG. 2 is a diagram of the components of a data sharing module for managing data sharing, according to one embodiment.

FIG. 2 is a diagram of components of the data sharing manager (DSM) 109 for managing data sharing at a user device, according to one embodiment. It is contemplated that the functions of these components may be combined in one or more components or performed by other components of equivalent functionality. In this embodiment, the DSM 109 includes a controller 201, a communication module 203, an enforcement module 205, a data module 207, an identity management module 209, a transformation module 211, a call alert module 213 and a user interface module 215. The controller 201 oversees tasks performed by the various other modules. In addition, the DSM 109 also accesses privacy policy data 217 and local data from databases 115a-115n.

As mentioned, privacy policy data 215a indicates specific privacy policy settings and what data is eligible for return in response to a request for local data by a particular application of the device (e.g., an API call). The local database 215b may contain various local data, including that acquired by the device or that available for acquisition and storage to the database by way of one or more sensors 113a-113n. In addition, the privacy policy object database 215b may store the various objects as acquired via the data module 207 from a third party policy service provider 121. As mentioned previously, the objects may be associated with specific policies maintained in the policy database 215a. The data defines various instructions for enabling visual, audible or other indicators to be executed by a device in response to a policy setting. By way of example, the policy execution rules 115 may designate or supply the graphic data, sound data, interface media resources, user interface code (like JavaScript or Qt Meta-Object Language (QML)), or a combination thereof required to implement a specific indicator at the user device.

It is noted, therefore, that the privacy policy data 215a is associated with requisite data and/or instructions (e.g., privacy policy objects data 215b) for affecting operation of the device (playing of a sound, presentment of an icon, etc.), responsive to a request for local data 215c by an application.

In one embodiment, the alert module 213 receives notice of a request for data sharing by one or more applications, one or more other user devices and/or one or more services platform 107. The one or more applications may be an application (e.g., UE application 111) in the user device (e.g., UE 101) or another device. The services platform may be any type of service, including social networking services, digital media services, etc. The requested data may include context data, user identity data, user profile data, etc. The requested data may also include media data in the user device. The context data may include location information, sensor data, user calendar data, time, weather, etc. The location information may also be the sensor data that is obtained via a location sensor such as the GPS device. Upon determining one or more requests, the alert module 213 notifies a data module 207 of the request. In certain embodiments, the alert module 213 is triggered when an application 111 or a service attempts to access a one or more data items 113a-113n for further determining or generating local data 215c.

The data module 207 retrieves data from the privacy policy database 215a to determine a specified privacy setting or action to be taken. In addition, the data module 207 determines one or more privacy policy objects from the object database 215b that are to be associated with the local data 215c. It is noted also that the data module 207 also manages various types of data, as maintained in the various databases 215a-215c, and also is capable of determining elements within a data. Based on the determined privacy action, the data module 207 alerts the enforcement module 205, which further initiates execution of the various other modules (e.g., communication module 203 or presentation module 211) with respect to a request for data sharing. Initiation of the action associated with the privacy policy data 215a, policy objects 215b or local data 215c is performed in connection with an enforcement module 205.

In one embodiment, the communication module 203 manages communication of data among the UE 101, other user devices, the services platform 107 and the third party policy provider 121. The communication module 203 also manages communication of signals (e.g., a request, a command) that are communicated among the UE 101, other user devices, the service platform 107 and the third party policy provider 121.

The communication module 203 may also be configured to generate a prompt of notification to the user regarding the specific privacy policy data 215a, local data 215c or a combination thereof. For example, the communication module 203 may process or facilitate processing of the one or more policy objects 215b to cause the UE 101 to generate an on screen message, play an audio cue, display an icon, adapt a color, hue or transparency of information presented to the display of UE 101, or any other prompt in response to one or more requests for data sharing. Operating in connection with the enforcement module 205, the communication module can also be set to deny sharing of any data altogether and request an error code be returned by the communication module 203.

In certain embodiments, the presentation module 211 causes one or more presentations of one or more requests for sharing data. The presentation module 211, possibly in conjunction with one or more other UE 101 applications, construct and present, for example, a graphical flow of data being shared (e.g., transmitted and/or received) via the UE 101. The presentation module 211 may also operate in connection with the communication module 203 to enable adjusting of how data is presented to the display with respect to amount of data being shared (e.g., transmitted and/or received) such as to make it clear and understandable to the user. This may include adjusting the granularity or level of detail of information.

In one embodiment, the data module 207 may associate the shared data with content associated with one or more sources and/or one or more destinations of the shared data. For example, if the shared data is related to location information of the user device, the source of the request for sharing the data (e.g., an advertising service) and the destination of the shared data (e.g., a merchant server) are indicated in the presentation to the user.

In one embodiment, the identity management module 209 determines and manages various identities including identities of users, identities of applications and application providers/venders as well as identities of the devices (e.g., UE 101). As such, the identity management module 209 determines identities of the applications, the services, devices, the users, the system, etc. such that appropriate privacy policy may be used depending on their identities. In addition, the identity management module can also keep tabs on which applications have requested privacy policy data 215a, and use that information for impacting the user experience. This may include executing, at the user device, a sound to be played, icon to be generated, etc. per execution of the modules that perform these functions (e.g., communication module 203).

In another embodiment, user input module 217 determines one or more inputs by the user related to the presentation of the information on data sharing. For example, the user can select, highlight and/or touch (e.g., on a touch sensitive display) one or more presented icons/indicators in order to view contextual information (e.g., source, destination, metadata, actual data, etc.) about the data targeted for sharing. In another example, the user may select one or more icons representing one or more data targeted for sharing and perform one or more actions on the data items (e.g., move along a time line, stop the progress, pause progress, cancel the sharing and the like).

Figure 3:
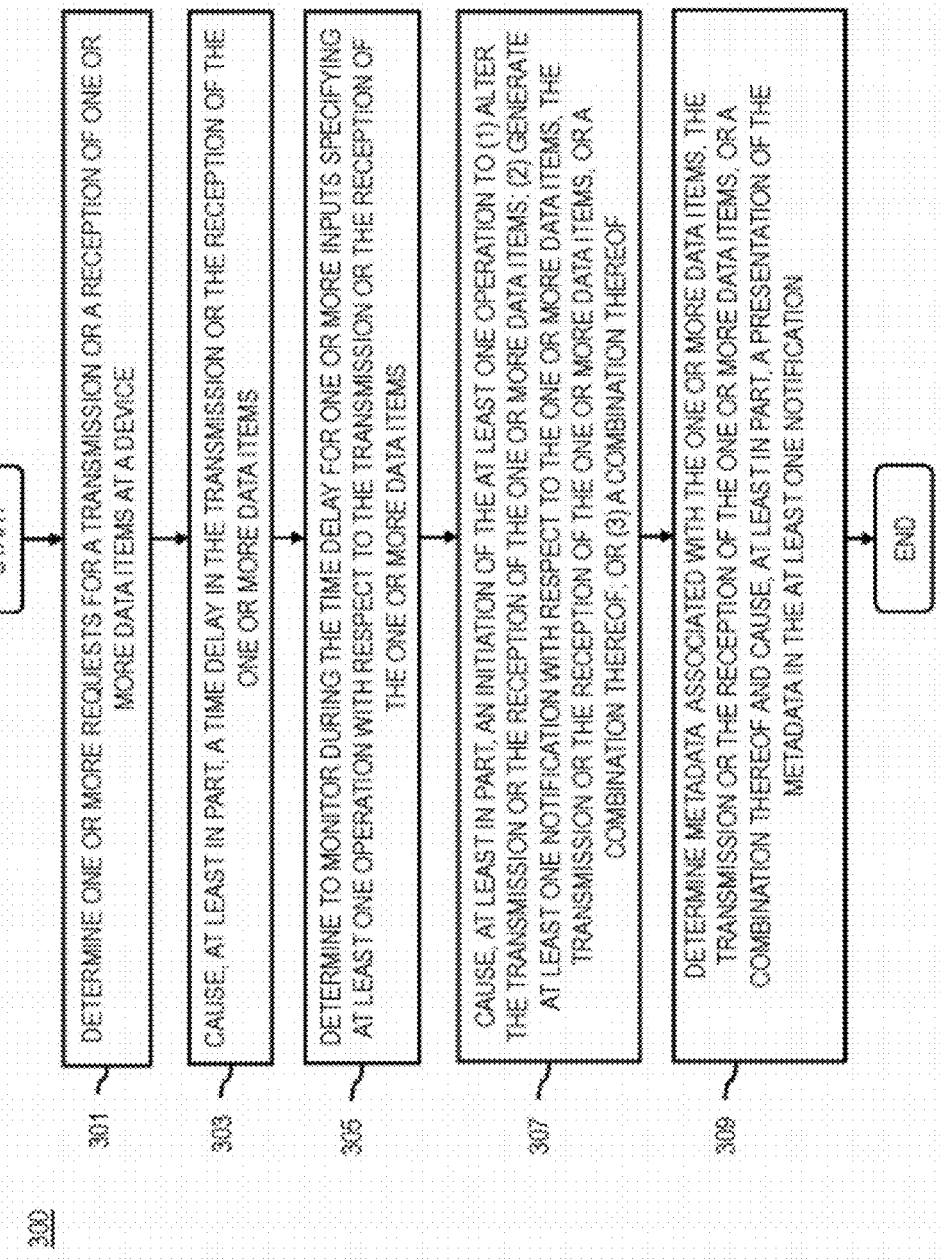
FIGS. 3 and 4 are flowcharts of processes for managing data sharing, according to various embodiments.
Figure 4:
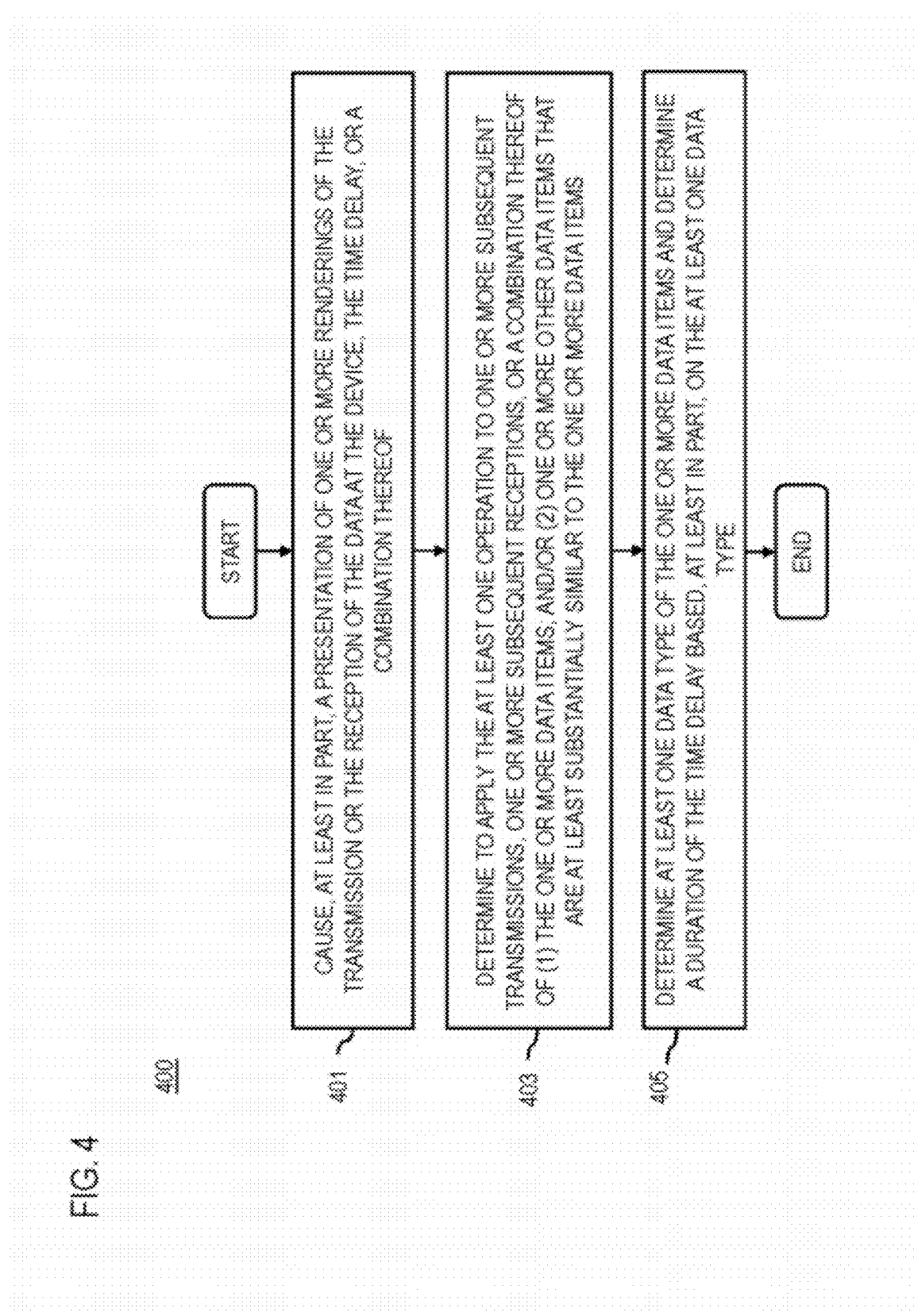
Figure 9:
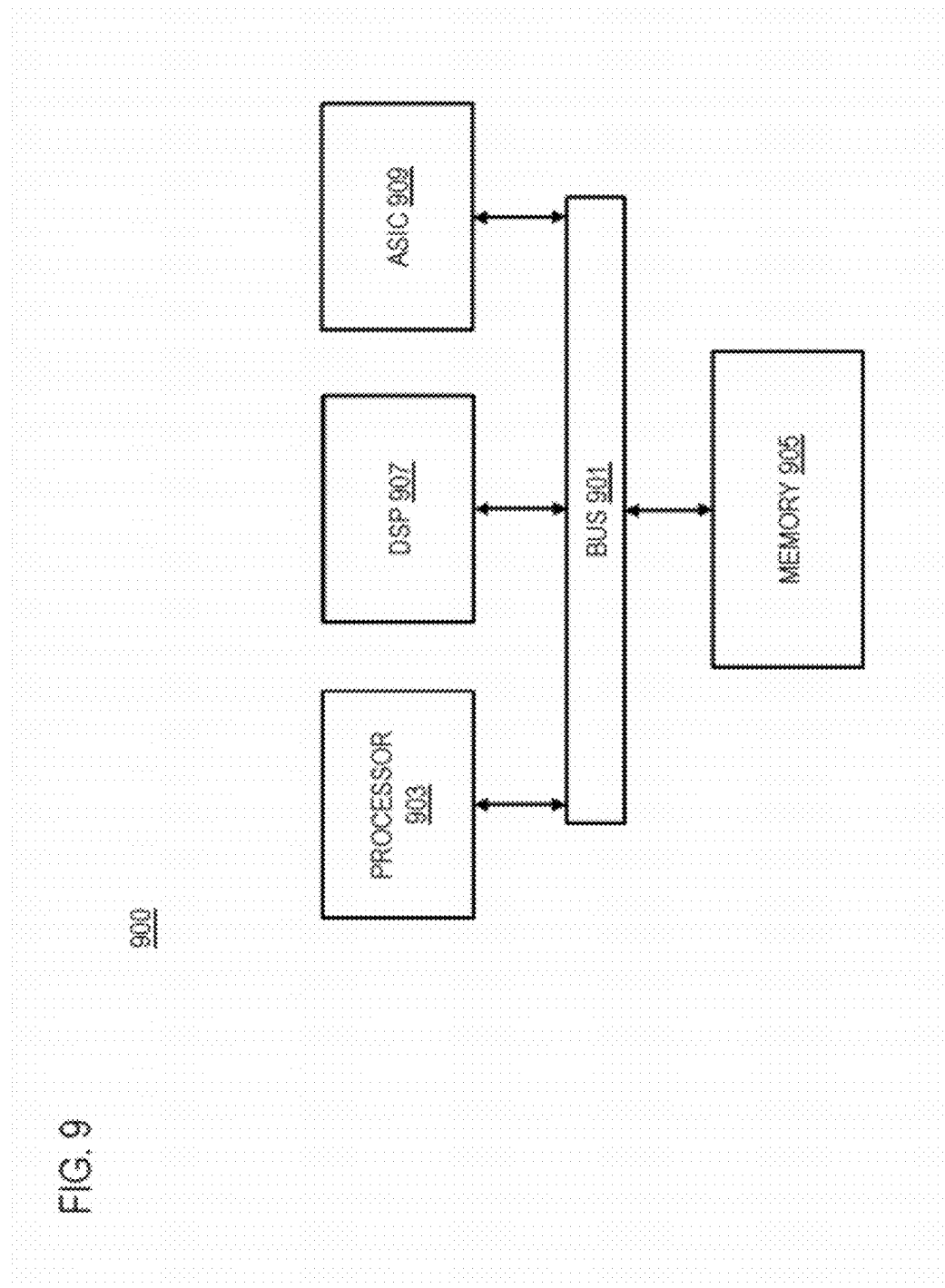
FIG. 9 is a diagram of a chip set that can be used to implement an embodiment of the invention.

FIGS. 3 and 4 are flowcharts of processes for managing data sharing, according to various embodiments. In one embodiment, the data sharing manager (DSM) 19 performs the processes and is implemented in, for instance, a chip set including a processor and a memory as shown in FIG. 9. For the purpose of illustration, the processes are described with respect to FIG. 1. It is noted that the steps of the process may be performed, combined and/or separated in any suitable manner.

In step 301 of process 300, the data sharing manager (DSM) 109 determines one or more requests for a transmission or a reception of one or more data items at a device. In one embodiment, one or more requests may be initiated by one or more applications 111 (e.g., a map application, a search application, web browser, etc.) and/or by one or more services platforms 107 (e.g., an e-commerce server, an advertising service, a coupon service, etc.) for the user and/or the UE 101 to transmit one or more user data items. For example, a search application on UE 101 and/or a service platform 107 providing search services may request user location information so that the search service can, at least in part, utilize the location information and return one or more relevant results. In another embodiment, one or more requests may be initiated by one or more applications 111 (e.g., a map application, a search application, web browser, etc.) and/or by one or more services platforms 107 (e.g., an e-commerce server, an advertising service, a coupon service, etc.) for the UE 101 to receive one or more data items. For example, one or more applications 111 and/or one or more services platform 107 may request for the UE 101 to receive one or more updates to the one or more applications 111.

In step 303, the data sharing manager (DSM) 109 causes, at least in part, a time delay in the transmission or the reception of the one or more data items. In one embodiment, the time delay is determined based, at least in part, on the type of the one or more data items, source of the one or more data items, destination of the one or more data items, whether the one or more data items are to be transmitted or are to be received by the UE 101, status of the one or more data items (e.g., urgent, important, low priority, etc.). For example, a data item to be transmitted by the UE 101 to a service platform 107 may need to be sent within 60 seconds in order for the data item to be useful and/or utilized.

In step 305, the data sharing manager (DSM) 109 determines to monitor during the time delay for one or more inputs specifying at least one operation with respect to the transmission or the reception of the one or more data items. In one embodiment, a user may choose to take one or more actions on one or more data items, whether to be transmitted or received, before the transmission or reception of the data item. For example, a user may choose to delay, pause, stop, cancel the transmission or reception of one or more data items.

In step 307, the data sharing manager (DSM) 109 causes, at least in part, an initiation of the at least one operation to (1) alter the transmission or the reception of the one or more data items; (2) generate at least one notification with respect to the one or more data items, the transmission or the reception of the one or more data items, or a combination thereof; or (3) a combination thereof. In one embodiment, the DSM 109 and/or one or more applications 111 can affect the transmission and/or reception of one or more data items, for example, by delaying, pausing, stopping, cancelling, postponing, and the like, of the one or more data items. In another embodiment, one or more notifications can be presented to the user indicating one or more requests for transmission and/or reception of one or more data items. The indicators can be represented by one or more different user interface elements such as an icon, a bubble, a message window and the like. Further, the indicators may be presented along a timeline showing a progress from one or more sources to one or more destinations. For example, a notification can indicate that an application on UE 101 is attempting to transmit its version status to a services platform 107 (e.g., a software vendor) and seek a possible update.

In another example, a social networking service is requesting to send one or more updates (e.g., contact updates) to one or more applications on the UE 101. The notification may include an icon, a sound, haptic feedback, a change in color of an icon, etc. Also, the DSM 109 may be configured to determine at least one source of the data item such that the notification is generated to represent that source. For example, if the data item is related to location of the user device (e.g., GPS sensor), then an icon representative of this source is presented at the UE 101 user interface. It is noted that presentation of the at least one notification is not limited to visual presentation to a display, but also includes the execution of a sound, activation of a light (e.g., flickering), performance of a vibratory movement of the device, or the like.

In step 309, the data sharing manager (DSM) 109 determines metadata associated with the one or more data items, the transmission or the reception of the one or more data items, or a combination thereof and 109 cause, at least in part, a presentation of the metadata in the at least one notification. In one embodiment, metadata may be associated and presented along with the one or more notifications, the one or more requests and the one or more data items which are to be transmitted and/or received. For example, a notification can indicate to user1 on UE 101a that a personal electronic business card is being requested by user2 and/or UE 101b. Further, the metadata can identify the user2 and/or UE 101b, whether the user2 and/or UE 101b are registered (e.g., in UE 101a contact list) within the UE 101a. In another example, a notification and associated metadata can indicate the transmission and/or the reception medium (e.g., via a near filed communication (NFC) channel, via a cellular channel, via Bluetooth®, etc.).

Moreover, the metadata can include information indicating, at least in part, one or more potential benefits and/or risks related to transmission and/or reception of the one or more data items. For example, the metadata can indicate that sharing user location information can reveal (e.g., possible risk) user's location to other users and/or service platforms while it can provide for a better search results (e.g., possible benefit). In another example, the metadata can indicate that sharing personal information (e.g., phone number, address, bank account information, credit card information, financial information, etc.) on a social networking site can be risky. In another example, the metadata can indicate that receiving one or more data items from a service platform 107 can update an old version of a software regularly utilized by the user (e.g., indicate the benefit for the user).

In step 401 of process 400 in FIG. 4, the data sharing manager (DSM) 109 causes, at least in part, a presentation of one or more renderings of the transmission or the reception of the data at the device, the time delay, or a combination thereof. In one embodiment, indicators of and/or progress of the transmission and/or reception of the one or more data items are presented along a timeline. For example, one or more indicators (e.g., icons, bubbles, etc.) may show one or more requests for transmission and/or reception of one or more data items. Further, the one or more indicators may be shown along a timeline, in a list, and or via other methods wherein the user can view and/or interact with the one or more data item indicators (e.g., pause, stop, cancel, recall, etc.). In another embodiment, the presentation of the indicators and/or metadata include, at least in part, information related to one or more sources and/or or one or more terminating points for the one or more data items. For example, the presentation may indicate that a "data item 1" has originated from application 111a on the UE 101 and is intended to be transmitted to services platform 107c. In another example, the presentation may indicate that a "data item 2" has originated from services platform 107g and is intended for application 111d on the UE 101. In another embodiment, the one or more applications 111 and/or the one or more services platform 107 include one or more cloud computing components.

In step 403, the data sharing manager (DSM) 109 determines to apply the at least one operation to one or more subsequent transmissions, one or more subsequent receptions, or a combination thereof of (1) the one or more data items; and/or (2) one or more other data items that are at least substantially similar to the one or more data items. In one embodiment, the DSM 109 and/or one or more applications 111 may create and/or maintain one or more lists of one or more previous data items for sharing the and operations (e.g., allow, stop, pause, cancel, refuse, recall, etc.) associated with the transmission and/or the reception of the one or more data items, which operations the UE 101 may apply to substantially similar one or more subsequent data item transmission and/or reception. For example, if a user previously stopped transmission of one or more data items of type secret, then the UE 101 may stop transmission of one or more subsequent data items of type secret. In another example, if a user previously accepted from a services platform 107 an update to a browser application, then the UE 101 may accept reception of at least one subsequent such update from the services platform 107.

In step 405, the data sharing manager (DSM) 109 determines at least one data type of the one or more data items and determines a duration of the time delay based, at least in part, on the at least one data type. In one embodiment, data type may be identified as urgent, high priority, low priority, private, confidential, secret, essential, and the like. Further, the time delay (e.g., before a data item is transmitted and/or received at UE 101) may be based, at least in part, on the identified data type. For example, if the type is identified as low priority then a longer time delay may be assigned to it and may be placed in a lower priority in a list of data items to be acted upon by the user and/or the UE 101. In another example, if a data item is of type urgent, then it may be assigned a shorter time delay and moved to the top of the list to be acted upon by the user and/or the UE 101. In another example, if a data item is identified as secret and/or essential, then the progress of the transmission and/or the reception may be paused until the user and/or the UE 101 has acted upon it (e.g., review and/or approve to send or receive).

Figure 5B:
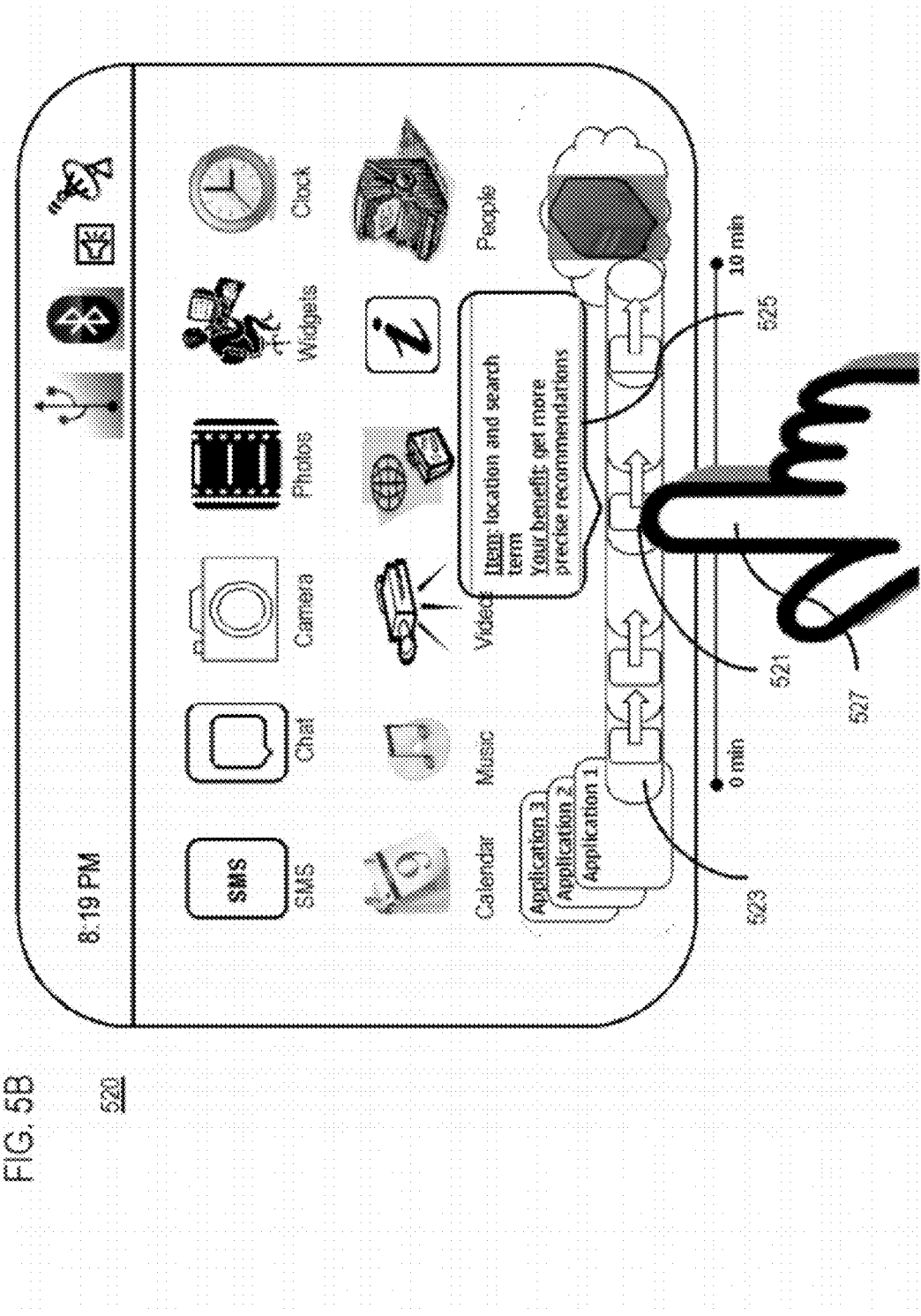

FIGS. 5A-5D are diagrams of user interfaces utilized in the processes of FIGS. 3 and 4, according to various embodiments. By way of example, the diagrams pertain to interfaces for enabling a user to manage data sharing via a user device. With respect to FIG. 5A, 501 shows an example user interface display area of a user device wherein one or more icons (e.g., of applications, data items, user defined objects, etc.) are depicted. As noted earlier, the user and or the user device UE 101 may share (e.g., transmit and/or receive) one or more data items which can be presented, indicated by 503, on a user interface and wherein the progress of the one or more transmissions and/or the receptions may be shown, for example, on a progress channel 505. Further, one or more measures (e.g., time, percentage, etc.) of progress of the one or more transmissions and/or receptions may be shown as in 507 which may indicate, for example, time from one or more sources 509 to one or more terminating points 511. For example, a "data item 1" from the source "application 1" is to be transmitted to a services platform 511 and is progressing along the indicator channel 505.

FIG. 5B shows a user interface 520 showing various data items along an indicator channel 523. In one embodiment, a user 527 may select (e.g., by highlighting, touching, clicking, etc.) one or more data items such as 521 in order to take one or more actions. For example, the user can view one or more metadata 525 related to the one or more data items such as 521 wherein the metadata can present information on the data item such as type, priority, source, terminating point (e.g., destination). Furthermore, one or more benefits and/or risks related to sharing the one or more data items may be indicated as part of the metadata and/or in a separate indicator/message. For example, if location information of the user (e.g., user device) is to be shared with a services platform, the metadata may indicate a benefit of more accurate location-based-services for the user.

Figure 5C:
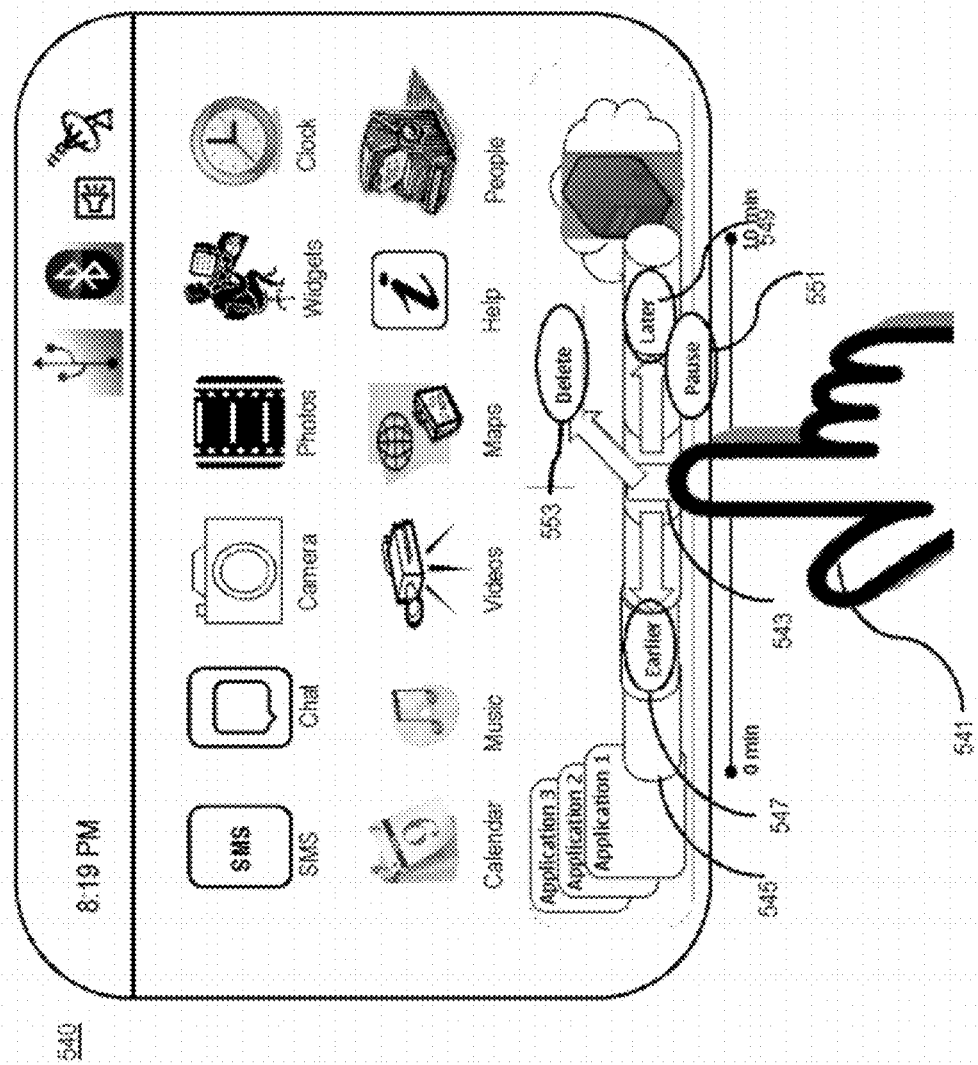

FIG. 5C shows a user interface 540 wherein a user can perform one or more actions on one or more data items for sharing. In one embodiment, the user 541 selects a data item 543 progressing along the channel 545 and performs one or more actions such as delay the progress as in 547, advance the progress as in 549, pause the progress as in 551 or delete the data item (e.g., prevent, cancel) from the sharing process as in 553.

FIG. 5D shows another user interface 560 representation of sharing one or more data items at a user device UE 101. In one embodiment, a data item represented by one or more indicators 561 (e.g., a bubble, a balloon, a box, etc.) may be shared between "Application 1" 563 (e.g., source or termination point) and a service platform 567 (e.g., source or termination point) where in the progress may be shown along an indicating channel 565. Further, the indicators 565 may include metadata items (e.g., type, priority, source, destination, risk, benefit, etc.) related to the one or more data items to be shared.

Figure 6:
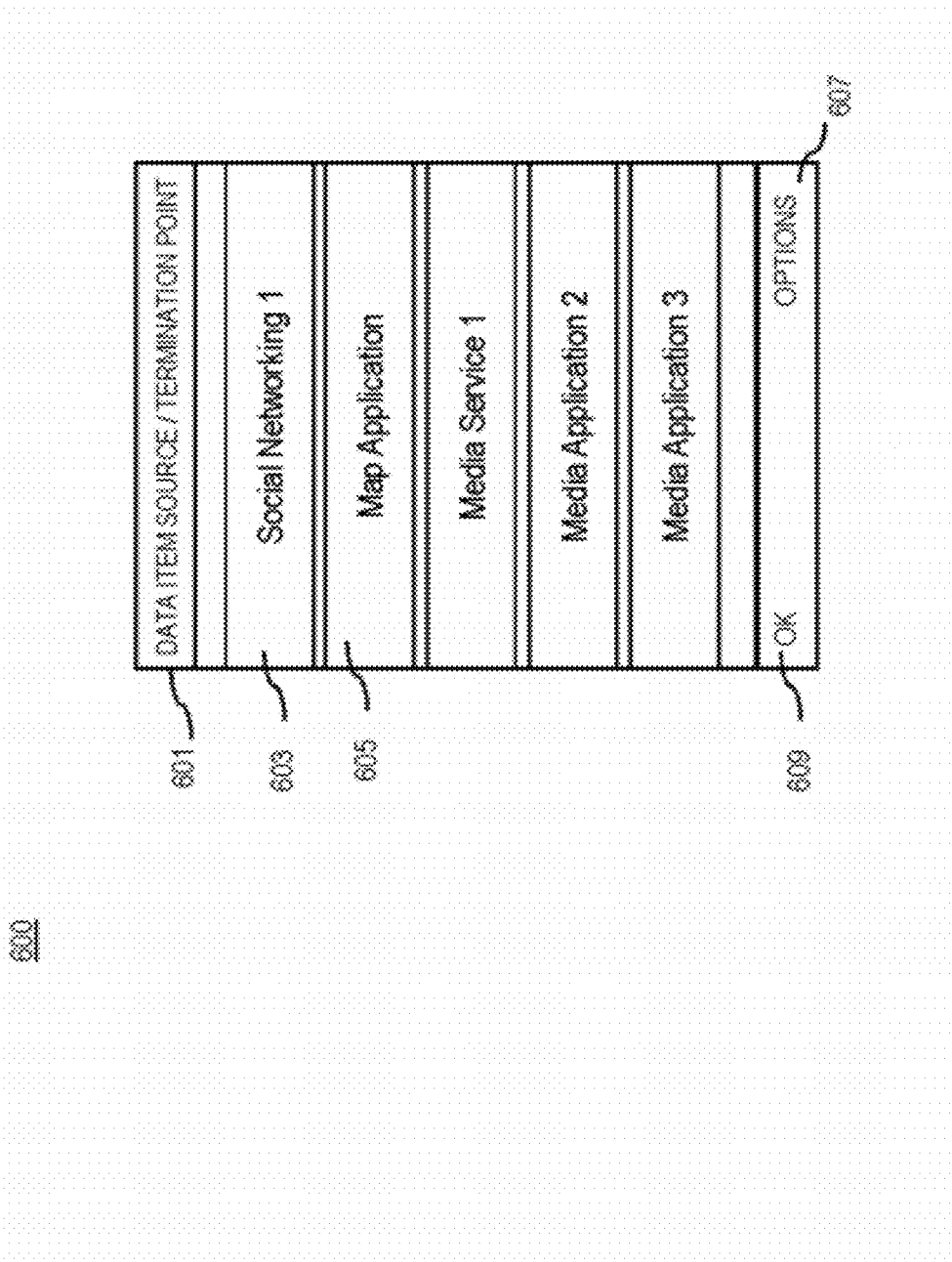

FIG. 6 shows user interface 600 showing one or more information related to one or more sources and/or termination points 601 related to one or more data items for sharing. For example, 603 (e.g., social networking 1) and 605 (e.g., map application) may indicate a source and/or or a termination point related to a data item. Further, the user may select from an options list 607 (e.g., accept, share, stop, pause, etc.) and proceed at 609.

Figure 7:
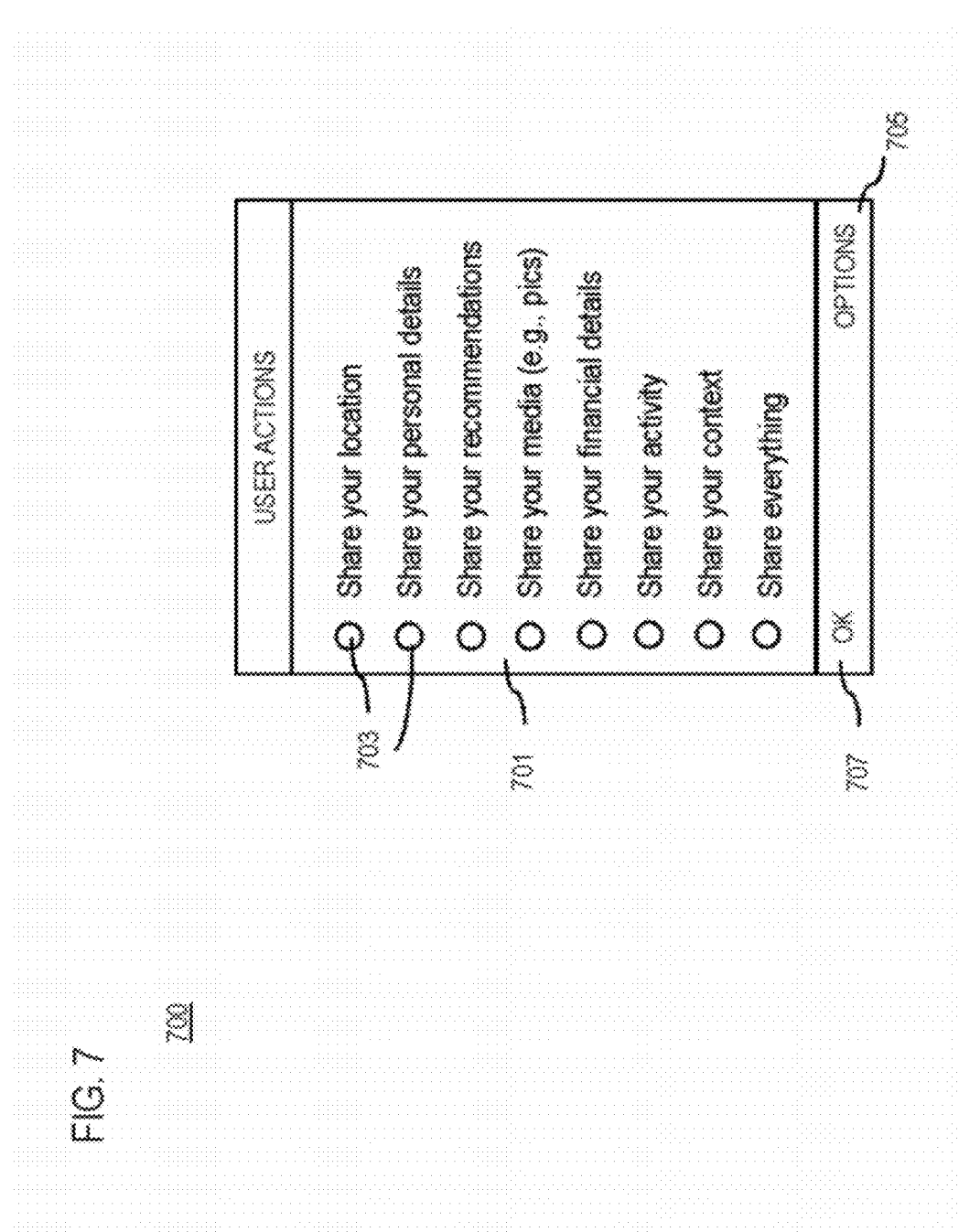

FIG. 7 is another user interface 700 showing a list 701 of possible data types for sharing wherein the user can take one or more actions to be performed on the one or more data items for sharing. In one embodiment, 703 indicates possible data types of the one or more data items to be shared which the user may select from one or more options 705 and proceed at 707 with the one or more selected actions.

The processes described herein for managing data sharing may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
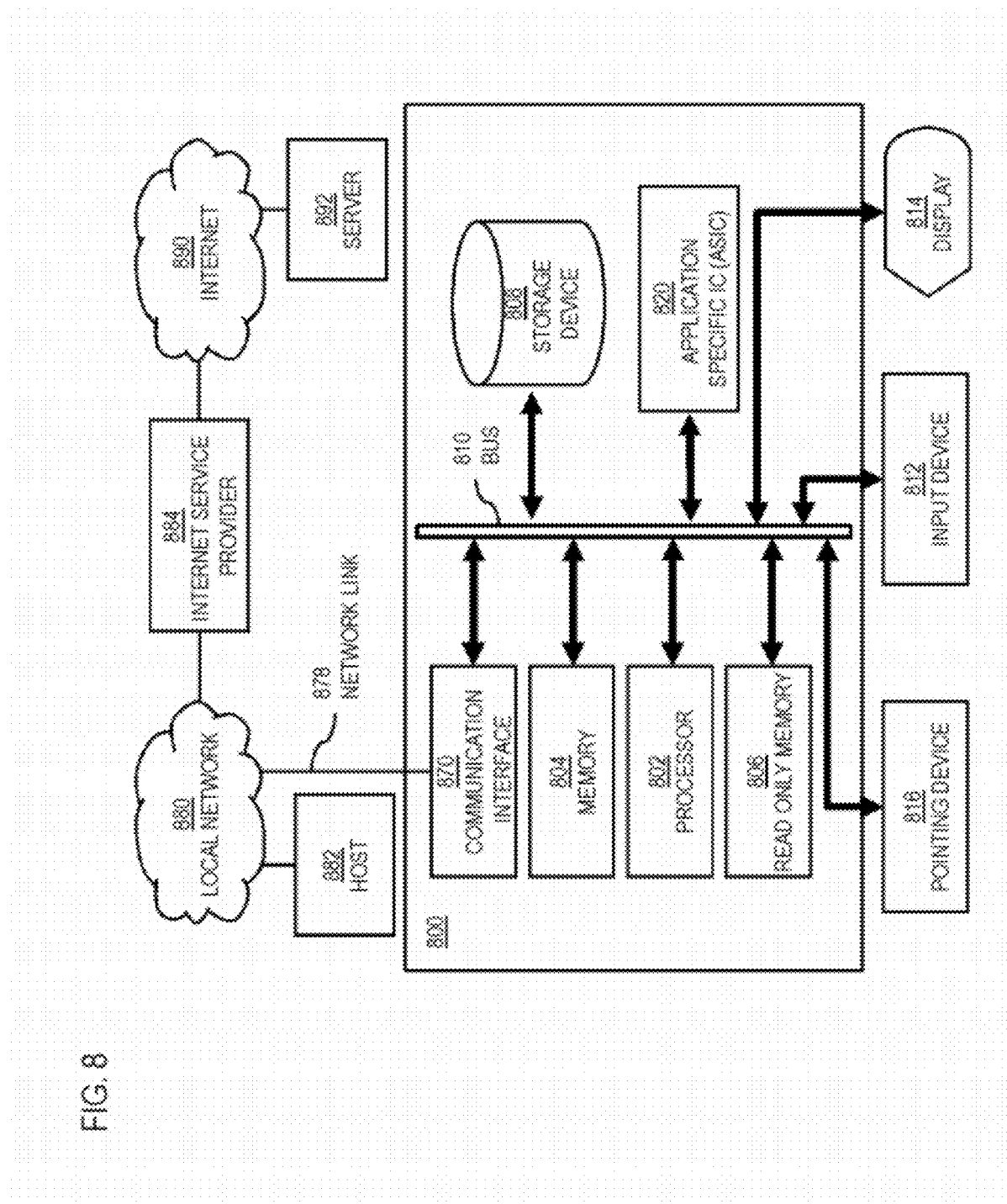
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to manage data sharing as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of managing data sharing.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to managing data sharing. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for managing data sharing. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for managing data sharing, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for managing data sharing.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to manage data sharing as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of managing data sharing associated with the availability of functions. Chip set or chip 900, or a portion thereof, constitutes a means for performing one or more steps of managing data sharing.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to manage data sharing. The memory 905 also stores the data associated with or generated by the execution of the inventive steps.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of managing data sharing. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of managing data sharing. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to manage data sharing. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining metadata for one or more data items based, at least in part, on one or more requests for a transmission or a reception of one or more data items at at least one device;
   causing, at least in part, a time delay in the transmission or the reception of the one or more data items based, at least in part, on the metadata for one or more data items;
   causing, at least in part, a presentation of contextual information for one or more data items at the at least one device; and
   determining to monitor during the time delay for one or more user inputs specifying at least one operation with respect to the transmission or the reception of the one or more data items.

2. A method of claim 1, further comprising:
   causing, at least in part, an initiation of the at least one operation to (1) alter the transmission or the reception of the one or more data items; (2) generate at least one notification with respect to the one or more data items, the transmission or the reception of the one or more data items, or a combination thereof or (3) a combination thereof.

3. A method of claim 1, wherein the metadata includes, at least in part, data type with respect to the transmission or the reception of the one or more data items, and wherein data type include high priority data, low priority data, confidential data, or a combination thereof.

4. A method of claim 1, further comprising:
   causing, at least in part, a presentation of one or more renderings of the transmission or the reception of the data at the device, the time delay, or a combination thereof.

5. A method of claim 4, wherein the one or more renderings indicate, at least in part, one or more originating points, one or more terminating points, or a combination thereof of the transmission or the reception of the one or more data items.

6. A method of claim 5, wherein the one or more originating points, one or more terminating points, or a combination thereof include, at least in part, one or more applications, one or more services, one or more cloud computing components, or a combination thereof.

7. A method of claim 1, wherein the one or more data items include, at least in part, one or more privacy data items.

8. A method of claim 1, further comprising:
determining to apply the at least one operation to one or more subsequent transmissions, one or more subsequent receptions, or a combination thereof of (1) the one or more data items; and/or (2) one or more other data items that are at least substantially similar to the one or more data items.

9. A method of claim 1, further comprising:
determining at least one data type of the one or more data items; and
determining a duration of the time delay based, at least in part, on the metadata for one or more data items.

10. A method of claim 1, wherein contextual information include source information, destination information, metadata, actual data, or a combination thereof.

11. An apparatus comprising:
at least one processor; and
at least one memory including computer program code for one or more programs,
the at least one memory and the computer program code configured to, with the at least one processor, cause the apparatus to perform at least the following,
determine metadata for one or more data items, based, at least in part, on one or more requests for a transmission or a reception of one or more data items at at least one device;
cause, at least in part, a time delay in the transmission or the reception of the one or more data items based, at least in part, on the metadata for one or more data items;
cause, at least in part, a presentation of contextual information for one or more data items at the at least one device; and
determine to monitor during the time delay for one or more user inputs specifying at least one operation with respect to the transmission or the reception of the one or more data items.

12. An apparatus of claim 11, wherein the apparatus is further caused to:
cause, at least in part, an initiation of the at least one operation to (1) alter the transmission or the reception of the one or more data items; (2) generate at least one notification with respect to the one or more data items, the transmission or the reception of the one or more data items, or a combination thereof or (3) a combination thereof.

13. An apparatus of claim 1, wherein the metadata includes, at least in part, data type with respect to the transmission or the reception of the one or more data items, and wherein data type information include high priority data, low priority data, confidential data, or a combination thereof.

14. An apparatus of claim 11, wherein the apparatus is further caused to:
cause, at least in part, a presentation of one or more renderings of the transmission or the reception of the data at the device, the time delay, or a combination thereof.

15. An apparatus of claim 14, wherein the one or more renderings indicate, at least in part, one or more originating points, one or more terminating points, or a combination thereof of the transmission or the reception of the one or more data items.

16. An apparatus of claim 15, wherein the one or more originating points, one or more terminating points, or a combination thereof include, at least in part, one or more applications, one or more services, one or more cloud computing components, or a combination thereof.

17. An apparatus of claim 11, wherein the one or more data items include, at least in part, one or more privacy data items.

18. An apparatus of claim 11, wherein the apparatus is further caused to:
determine to apply the at least one operation to one or more subsequent transmissions, one or more subsequent receptions, or a combination thereof of (1) the one or more data items; and/or (2) one or more other data items that are at least substantially similar to the one or more data items.

19. An apparatus of claim 11, wherein the apparatus is further caused to:
determine at least one data type of the one or more data items; and
determine a duration of the time delay based, at least in part, on the metadata for one or more data items.

* * * * *